(12) United States Patent
Toomey

(10) Patent No.: US 11,062,267 B1
(45) Date of Patent: Jul. 13, 2021

(54) AUTOMATED REACTIVE TALENT MATCHING

(71) Applicant: Geographic Solutions, Inc., Palm Harbor, FL (US)

(72) Inventor: Paul Toomey, Palm Harbor, FL (US)

(73) Assignee: Geographic Solutions, Inc., Palm Harbor, FL (US)

( * ) Notice: Subject to any disclaimer, the term of this patent is extended or adjusted under 35 U.S.C. 154(b) by 0 days.

(21) Appl. No.: 15/004,846

(22) Filed: Jan. 22, 2016

Related U.S. Application Data

(63) Continuation-in-part of application No. 11/393,394, filed on Mar. 30, 2006, now Pat. No. 9,390,422.

(51) Int. Cl.
| | |
|---|---|
| *G06F 16/00* | (2019.01) |
| *G06Q 10/10* | (2012.01) |
| *H04L 29/06* | (2006.01) |
| *G06F 16/248* | (2019.01) |
| *G06F 16/9535* | (2019.01) |
| *G06F 16/2457* | (2019.01) |

(52) U.S. Cl.
CPC ....... *G06Q 10/1053* (2013.01); *G06F 16/248* (2019.01); *G06F 16/24578* (2019.01); *G06F 16/9535* (2019.01); *H04L 67/42* (2013.01)

(58) Field of Classification Search
None
See application file for complete search history.

(56) References Cited

U.S. PATENT DOCUMENTS

| | | | |
|---|---|---|---|
| 5,197,004 A * | 3/1993 | Sobotka | G06Q 10/063112 705/7.14 |
| 5,806,043 A | 9/1998 | Toader | |
| 5,978,768 A | 11/1999 | McGovern et al. | |
| 6,213,780 B1 | 4/2001 | Ho et al. | |
| 6,370,510 B1 | 4/2002 | McGovern et al. | |
| 6,381,592 B1 | 4/2002 | Reuning | |
| 6,385,620 B1 | 5/2002 | Kurzius et al. | |
| 6,681,223 B1 * | 1/2004 | Sundaresan | G06Q 10/06 705/7.14 |
| 6,691,122 B1 * | 2/2004 | Witte | G06N 5/04 706/47 |
| 6,701,313 B1 | 3/2004 | Smith | |
| 6,728,695 B1 | 4/2004 | Pathria et al. | |

(Continued)

FOREIGN PATENT DOCUMENTS

WO    0210956    2/2002

OTHER PUBLICATIONS

Glazer, Ray et al., "One-stop shopping and vocational rehabilitation", American Rehabilitation, Washington: Autumn 1999. vol. 25, Issue 2, p. 8.

(Continued)

*Primary Examiner* — Bai D Vu
(74) *Attorney, Agent, or Firm* — Raubvogel Law Office

(57) ABSTRACT

Improved automated techniques are described that more efficiently match candidates to job opportunities. These techniques include a reactive matching process that uses improved pattern-matching algorithms to determine exactly how well a particular individual matches an employer's requirements. In at least one embodiment, results are displayed in real time using user-friendly visual indicators on job displays and/or on a dashboard.

69 Claims, 13 Drawing Sheets

(56) References Cited

U.S. PATENT DOCUMENTS

| | | | |
|---|---|---|---|
| 7,464,036 B1* | 12/2008 | Witte | G06Q 10/10 705/321 |
| 7,505,919 B2 | 3/2009 | Richardson | |
| 8,504,559 B1 | 8/2013 | Elman et al. | |
| 9,390,422 B2 | 7/2016 | Toomey | |
| 2001/0027439 A1 | 10/2001 | Holtzman et al. | |
| 2002/0038299 A1 | 3/2002 | Zernik et al. | |
| 2002/0055870 A1* | 5/2002 | Thomas | G06Q 10/06 705/7.14 |
| 2002/0072946 A1 | 6/2002 | Richardson | |
| 2002/0073160 A1 | 6/2002 | Purcell | |
| 2002/0091689 A1 | 7/2002 | Wiens et al. | |
| 2002/0111843 A1* | 8/2002 | Wellenstein | G06Q 10/063112 705/7.14 |
| 2002/0143573 A1* | 10/2002 | Bryce | G06Q 10/10 705/321 |
| 2003/0046311 A1 | 3/2003 | Baidya et al. | |
| 2003/0093322 A1 | 5/2003 | Sciuk | |
| 2003/0204439 A1 | 10/2003 | Cullen | |
| 2003/0229638 A1* | 12/2003 | Carpenter | G06Q 30/02 |
| 2004/0107112 A1 | 6/2004 | Cotter | |
| 2004/0148220 A1* | 7/2004 | Freeman, Jr. | G06Q 10/063112 705/7.14 |
| 2004/0162844 A1 | 8/2004 | Thome et al. | |
| 2004/0236598 A1 | 11/2004 | Thomsen | |
| 2005/0053908 A1 | 3/2005 | Satheesh et al. | |
| 2005/0071766 A1 | 3/2005 | Brill et al. | |
| 2005/0160014 A1 | 7/2005 | Moss et al. | |
| 2005/0188051 A1 | 8/2005 | Sneh | |
| 2006/0041532 A1 | 2/2006 | Nikolov | |
| 2006/0080134 A1 | 4/2006 | Toomey | |
| 2006/0155636 A1 | 7/2006 | Hermann et al. | |
| 2006/0206448 A1 | 9/2006 | Hyder et al. | |
| 2006/0229902 A1* | 10/2006 | McGovern | G06Q 10/06 705/7.14 |
| 2007/0239777 A1 | 10/2007 | Toomey | |
| 2008/0077299 A1* | 3/2008 | Arshad | A01B 79/005 701/50 |
| 2016/0247120 A1 | 8/2016 | Toomey | |

OTHER PUBLICATIONS

Mariani, Matthew, "A new credential for career development faciltators", Occupational Outlook Quarterly 42.3 (Fall 1998): 37-40.

PRNewswire. "Employment Publishing Launches Employment911.com to Provide No-Cost, One-Stop Solution for Job Seekers, Employers and Recruiters", PR Newswire, Apr. 7, 2000.

Ncholson, Scott, "Indexing and Abstracting the World Wide Web: An Examination of Six Web Databases", 1997, pp. 73-81.

\* cited by examiner

| Current Item | Job | Yourself |
|---|---|---|
| Projected Occupation | Heavy and Tractor-Trailer Truck Drivers | Computer Programmers |
| Education | Not Specified | Bachelor's Degree |
| Work Experience | Not Specified | None |
| Location | Zachary, LA 70791 US | Baton Rouge, LA 70802 US |
| Salary | Not Specified | $19.25 hourly ($40,000 annually) or more |

General Requirements Match Score: 50%

The table below shows a comparison of your background and requirements with those of this job.

Specialized Requirements Match

The table below shows a comparison of your specialized skills and requirements with those of this job.

| | Current Profile | Job | Match |
|---|---|---|---|
| Shift | Day Shift | Day | Yes |
| Minimum Age | Not Specified | 34 | |
| Drivers License Required | Not Specified | Regular Drivers License | |
| Drivers License Endorsements | Not Specified | Not Specified | |
| Typing Speed | Not Specified | 40 + wpm | |
| Security Clearance | No Clearance | No Clearance | |
| Language and Proficiency | Not Specified | Quadrilingual | |

Specialized Requirements Match Score: Yes

AUTOMATED REACTIVE TALENT MATCHING

CROSS-REFERENCE TO RELATED APPLICATION

The present application claims priority as a continuation-in-part of U.S. Utility application Ser. No. 11/393,394 for "System, Method and Computer Program Products for Creating and Maintaining a Consolidated Jobs Database," filed Mar. 30, 2006, which is incorporated by reference herein in its entirety.

TECHNICAL FIELD

The present disclosure relates to automated techniques for matching candidates to jobs, based on information stored in a candidate database and/or a jobs database.

DESCRIPTION OF THE RELATED ART

There are many ways for candidates to find employment and/or for employers to identify suitable candidates for potential hiring. Many candidates seek jobs by scanning advertisements, either online or in printed publications. Alternatively, candidates may submit résumés to recruiters and other job-matching professionals, who review these materials and try to find jobs that match qualifications and desires of the candidates. In some cases, employers looking for talent may use recruiters to "cold-call" potential hires, based on some determination that such individuals may be interested in a position at a particular employer.

Such existing techniques for matching job-seeking candidates to jobs tend to be inefficient and time-consuming, often failing to take into account all relevant factors. In particular, such techniques rely on humans to review qualifications (and other characteristics) of potential employees and to manually determine their suitability for particular jobs. Key factors and considerations may be missed or may not be correctly taken into account, due to human error, lack of knowledge, or the sheer amount of data involved.

As a result, existing techniques often fail to match candidates to those job opportunities for which they are best suited. In addition, existing techniques, even when they do achieve a measure of success, can be inefficient, expensive, and time-consuming.

SUMMARY

According to various embodiments, improved automated techniques are described that more efficiently match candidates to job opportunities, based on information stored in a candidate database and/or a jobs database. These techniques include a reactive matching process, by which the system automatically reviews key candidate information such as background, employment history, skills, location, and the like, and compares such information against key job posting information to determine how well the candidate matches a specific job. The reactive matching process uses improved pattern-matching algorithms to determine exactly how well a particular individual matches an employer's requirements. In at least one embodiment, results are displayed in real time using user-friendly visual indicators on job displays and/or on a dashboard.

In at least one embodiment, the system analyzes a comprehensive set of data elements about active candidates (job seekers), based on information entered manually (e.g., by the candidate) and/or information automatically extracted from the candidate's digital résumé. The system also analyzes data from job postings that have been entered directly into the system and/or information that has been obtained by aggregation of online job postings. Such information can be collected from any available source, such as for example websites of national and local employers, private job boards, social media sites, state job boards, local and federal government sites, military branch sites, hospitals, industry associations, recruiters, education institutions, green job boards, nonprofits, newspapers, volunteer sites, and/or chambers of commerce.

Based on such analysis, the system determines how well a candidate matches a particular job's requirements. The analysis and determination can be made using algorithms that determine the level and proximity of match of each of a number of elements. Each element can be assigned a weight.

Once the determination has been made, the system presents recommendations and/or other output to the candidate and/or to the employer. The display can be static or it can be interactive, in a manner that allows the candidate and/or the employer to drill down, change parameters, and/or otherwise interact with the display.

Further details and variations are described herein.

BRIEF DESCRIPTION OF THE DRAWINGS

The accompanying drawings illustrate several embodiments. Together with the description, they serve to explain the principles of the system and method according to the embodiments. One skilled in the art will recognize that the particular embodiments illustrated in the drawings are merely exemplary, and are not intended to limit scope.

FIG. 3 is a screen shot depicting an example of a displayed list of matching jobs, a according to one embodiment.

FIG. 4 is a screen shot depicting an example of a display of detailed information concerning a General Requirements Match score, according to one embodiment.

FIG. 5A is a screen shot depicting an example of a display of detailed information concerning a Specialized Requirements Match score, a according to one embodiment.

FIG. 5B is a screen shot depicting an example of a display of detailed information concerning a Skills Match score, a according to one embodiment.

FIG. 5C is a screen shot depicting an example of a display of detailed information concerning an Interest and Values Match score, a according to one embodiment.

DETAILED DESCRIPTION OF THE EMBODIMENTS

In at least one embodiment, the system described herein automates the process of matching candidates to jobs. One skilled in the art will recognize that the described techniques can be applied in other contexts. Accordingly, the following description is intended to illustrate various embodiments by way of example, rather than to limit scope.

System Architecture

According to various embodiments, the system can be implemented on any electronic device equipped to receive, store, and present information. Such an electronic device may be, for example, a desktop computer, laptop computer, smartphone, tablet computer, or the like.

Although the system is described herein in connection with an implementation in a computer, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Figure 1:
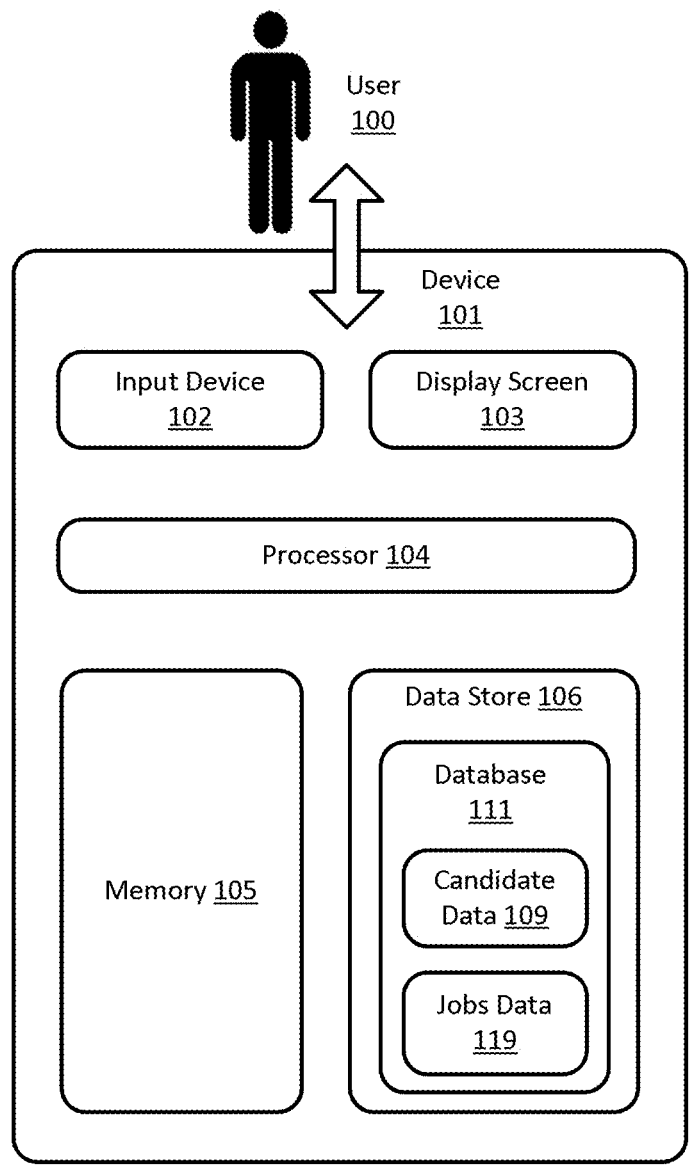
FIG. 1 is a block diagram depicting a hardware architecture for implementing a system for automated reactive talent matching, according to one embodiment.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include one or more databases, referred to collectively as a database 111, that can be utilized and/or displayed according to the techniques described below. In another embodiment, database 111 can be stored elsewhere, and retrieved by device 101 when needed for presentation to user 100. Database 111 may include one or more data sets, which may be used for a variety of purposes and may include a wide variety of files, metadata, and/or other data. In at least one embodiment, database 111 may include candidate data 109 (describing candidates and their characteristics) and jobs data 119 (describing employers and employment opportunities).

Display screen 103 can be any element that graphically displays information such as items from database 111, and/or the results of steps performed on such items to provide information useful to a user. Such output may include, for example, raw data, data visualizations, navigational elements, graphical elements drawing attention to data visualizations or graphical elements, queries requesting confirmation and/or parameters for information identification, display, or presentation, or the like. Additionally or alternatively, display screen 103 may display results of the reactive talent matching algorithms described herein in a wide variety of formats, including but not limited to lists, charts, graphs, and the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey values of displayed data items. In at least one embodiment, labels accompany data items on display screen 103, or can be displayed when user 100 taps on or clicks on a data entry, or causes an onscreen cursor to hover over a data item.

Furthermore, as described in more detail below, display screen 103 can selectively present a wide variety of data related to viewing, annotating, and/or modifying items such as jobs data, candidate data, matching job opportunities, scores, comparisons, and the like. In particular, as described herein, user 100 can provide input, such as a selection from a menu containing a variety of options, to determine the various characteristics of the information presented such as the type, scope, and/or format of the information to be displayed on display screen 103.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate means. This communication with other electronic devices is provided as an example and is not necessary.

In at least one embodiment, data store 106 is detachable in the form of a CD-ROM, DVD, flash drive, USB hard drive, or the like. Database 111 can be entered from a source outside of device 101 into a data store 106 that is detachable, and later displayed after the data store 106 is connected to device 101. In another embodiment, data store 106 is fixed within device 101.

Figure 2:
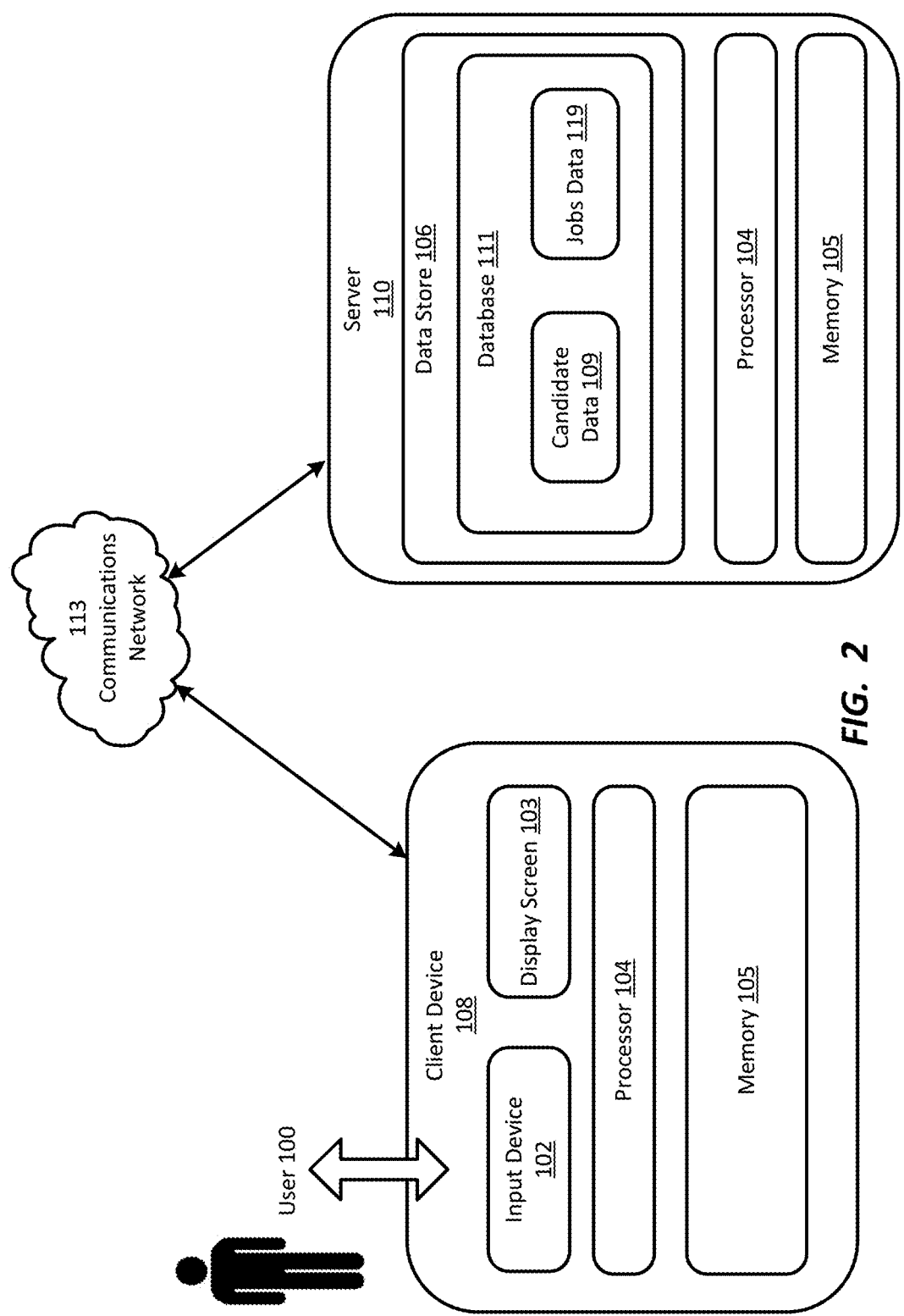
FIG. 2 is a block diagram depicting a hardware architecture for implementing a client/server system for automated reactive talent matching, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from the database 111, reports, and/or other data derived from the database 111 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 113, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 110 containing the requested data.

In this implementation, server 110 is responsible for data storage and processing, and incorporates data store 106 for storing database 111. Server 110 may include additional components as needed for retrieving data and/or database 111 from data store 106 in response to requests from client device 108.

In at least one embodiment, client device 108 and server 110 both include additional components such as processor 104 and memory 105, enabling them to perform computing functions as well known in the art.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, database 111 is organized in a file system within data store 106. Appropriate indexing can be provided to associate particular documents with particular quantitative data elements, reports, other documents, and/or the like. Database 111 may include any of a wide variety of data structures known in the database arts. As in FIG. 1, database 111 may include one or more data sets, which may include candidate data 109, jobs data 119, and/or other data (not shown).

Candidate data 109 and/or jobs data 119 can be retrieved from the data store 106, or from any other source. Data store 106 may be client-based and/or server-based. In at least one embodiment, input device 102 is configured to receive data entries from user 100, to be added to data store 106. User 100 may provide such data entries via the hardware and software components described above according to means that are well known to those skilled in the art. Server 110 may be connected to several client devices 108 that are used by various candidates, and may thus store candidate data 109 and/or jobs data 119 from multiple users and/or multiple client devices 108. Candidate data 109 and/or jobs data 119 may be used to generate various reports, which may, for example, be viewed by a candidate, recruiter, agent, or other individual on display screen 103 of client device 108 or on any other device.

Display screen 103 can be any element that graphically displays information such as items from the database 111, and/or the results of steps performed on such items to provide information useful to a user. Such output may include, for example, raw data, suggested matches, scores, tables, graphs, data visualizations, navigational elements, graphical elements drawing attention to data visualizations or graphical elements, queries requesting confirmation and/or parameters for information identification, display, or presentation, and/or the like. Additionally or alternatively, the display screen 103 may display results of the reactive talent matching algorithms in a wide variety of formats, including but not limited to lists, charts, graphs, and the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. In at least one embodiment, labels accompany data entries on display screen 103, or can be displayed when user 100 taps on or clicks on a data entry, or causes an onscreen cursor to hover over a data entry.

Furthermore, as described in more detail below, display screen 103 can selectively present a wide variety of data related to viewing, annotating, and/or modifying candidate data, jobs data, and/or match analyses. In particular, as described herein, user 100 can provide input, such as a selection from a menu containing a variety of options, to determine the various characteristics of the information presented such as the type, scope, and/or format of the information to be displayed on display screen 103.

Processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software.

In one embodiment, the system can be implemented as software written in any suitable computer programming language, whether in a standalone or client/server architecture. Alternatively, it may be implemented and/or embedded in hardware.

Method

As mentioned above, according to various embodiments, the system uses improved automated techniques to more efficiently match candidates to job opportunities. In at least one embodiment, the system uses a reactive matching process that employs improved pattern-matching algorithms to determine exactly how well a candidate (also referred to as a job seeker) matches an employer's requirements. In at least one embodiment, results are displayed in real time using user-friendly visual indicators on job displays and/or on a dashboard.

In at least one embodiment, the system analyzes a comprehensive set of data elements about candidates, based on information entered manually (e.g., by the individual) and/or information automatically extracted from the individual's digital résumé. The system also analyzes data from job postings that have been entered directly into the system and/or information that has been obtained by aggregation of online postings of jobs. Such information can be collected from any available source, such as for example websites of national and local employers, private job boards, social media sites, state job boards, local and federal government sites, military branch sites, hospitals, industry associations, recruiters, education institutions, green job boards, non-profits, newspapers, volunteer sites, and/or chambers of commerce.

Figure 6:
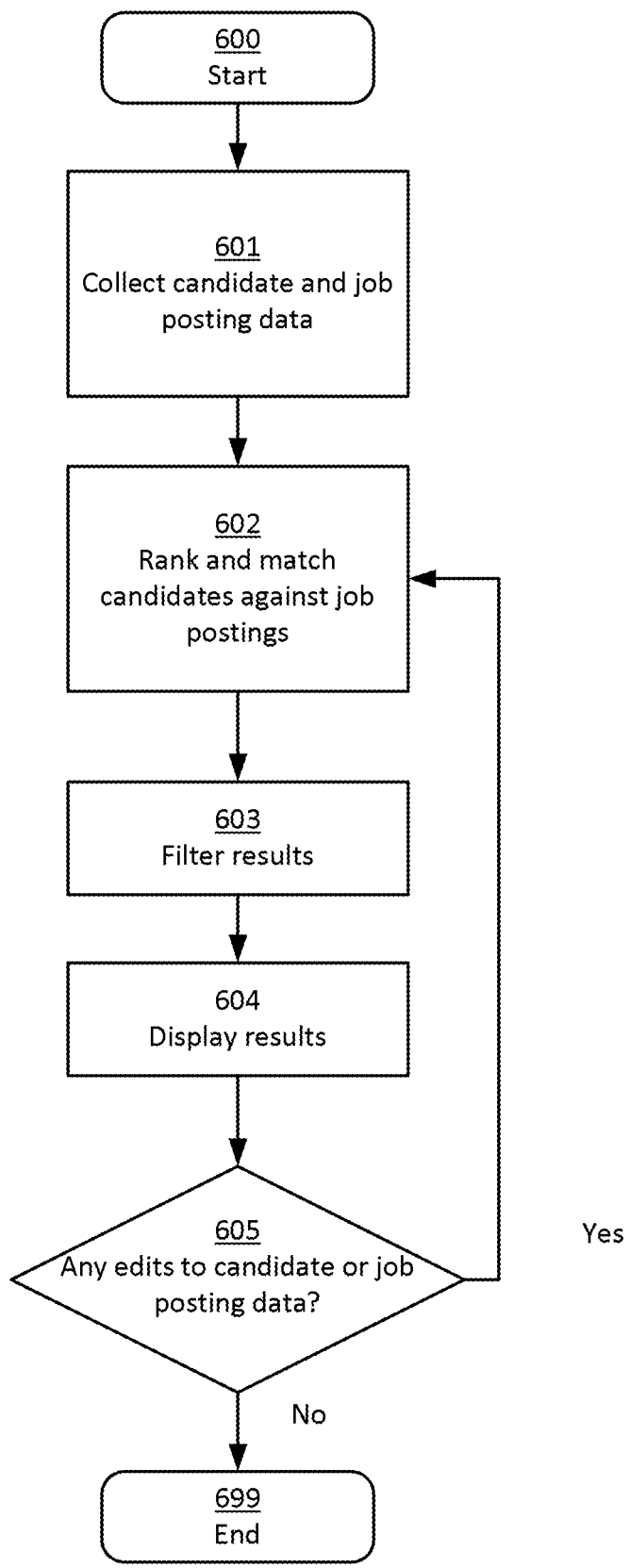
FIG. 6 is a flow diagram depicting an overall method for automated reactive talent matching according to one embodiment.

Referring now to FIG. 6, there is shown a flow diagram depicting an overall method for automated reactive talent matching according to one embodiment. The method depicted in FIG. 6 (and in FIGS. 7 to 10, described below) can be implemented using any suitable architecture, including for example those depicted in FIG. 1 or 2. In at least one embodiment, the method is implemented by processor 104 of device 101 or processor of server 110. In other embodiments, the steps can be performed by other components, or combinations of components.

The method begins 600. Candidate data and job posting data are collected 601. As described in more detail below, this can include collecting information entered directly into the system and/or information obtained by automated aggregation of online postings of jobs, social networks, profiles, and/or other data. Such information can be collected from any available source.

Based on the collected information, candidates are ranked and matched 602 against job postings. Results can be filtered 603, if desired, and are then displayed 604 to the candidate and/or to the employer.

In at least one embodiment, candidates can edit their profile data, and employers can edit their job postings. If any edits are made 605, the method returns to step 602.

Further details will be provided below, in connection with FIGS. 7A through 10.

Figure 7A:
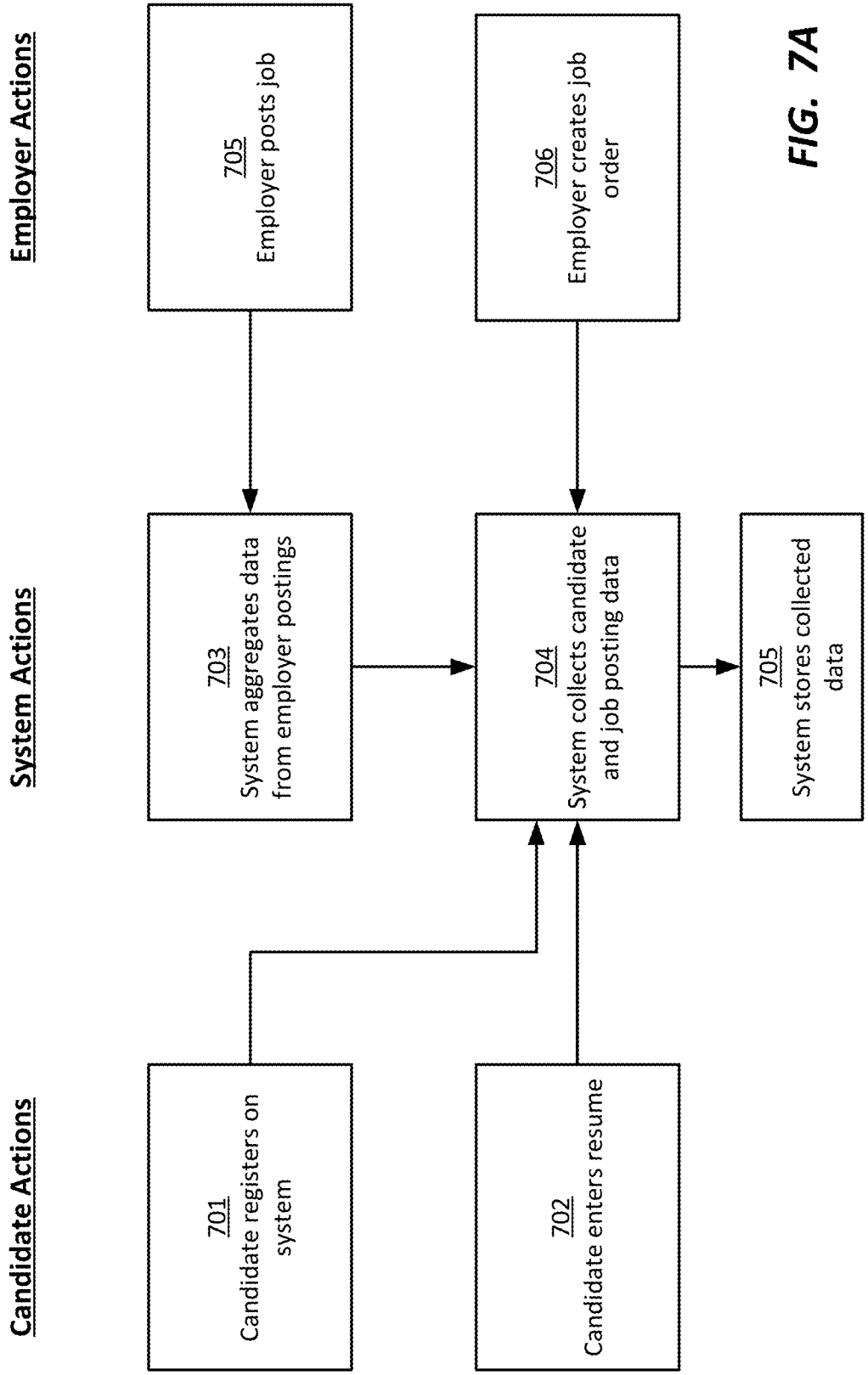
FIG. 7A is a flow diagram depicting method steps for collecting candidate and job posting data, according to one embodiment.

Referring now to FIG. 7A, there is shown a flow diagram depicting method steps for collecting candidate and job posting data, according to one embodiment. The left side of the Figure depicts actions (steps) generally performed by the candidate; the middle depicts actions generally performed by the system; and the right side depicts actions generally performed by the employer.

A candidate registers 701 on the system, for example, by entering key data elements that can be used to help match them to job postings. Examples of such data elements include, without limitation: Age; Residential Address; Highest Education Level; Preferred Occupation.

In at least one embodiment, the candidate enters information about his or her work history, such as for example by entering 702 a resume containing additional key data elements that can be used to help match them to job postings.

Any suitable mechanism, data collection scheme, and/or input paradigm can be used for performing step 702. For example, a candidate can upload a digital resume and/or complete a Resume Wizard or Background Wizard.

Data about job postings can be collected in any of a variety of ways. In at least one embodiment, an employer can create 706 a job order (posting) directly into the system. Alternatively, an employer can post 705 a job on an external site such as a private job listing website, social media site, or the like. In at least one embodiment, the system aggregates 703 data from such external sites containing employer postings.

The system collects 704 all candidate and job posting data, based on data entered in steps 702 and 706, and/or aggregated in step 703. Examples of data elements that may be collected in step 704 include, without limitation:
Candidate information:
Information about the candidate, such as: previous occupations; total experience; associated workplace skills; associated tools and technology.
Information about the type of job the candidate is looking for, such as: desired salary; desired location; shifts willing to work; complete driver's license information; security clearance level; language skills; typing speed; work interests and values; any additional workplace skills; and any additional tools and technology.

Job posting information:
General requirements, such as: job title, location of job worksite, education requirement, work experience requirement, salary the employer is willing to pay.
Specialized requirements, such as: shift, driver's license required, driver's license endorsement required, age restrictions, security clearance level specified, language skills required, typing skills required.

As mentioned above, any of the above information can be collected via any suitable mechanism, whether by explicit entry by the candidate, uploading of a resume, or by collection from any available source.

In at least one embodiment, the system stores 705 the collected data in a unified database, such as database 111 on server 110. The system now has sufficient data to employ pattern matching algorithms to determine which job postings are a best match for a particular candidate, as well as to determine exactly how well the candidate matches the employer's requirements.

Based on the information collected and stored in step 601, the system performs a first phase of analysis, wherein the system performs reactive matching to compare how well the candidate matches a job's requirements for education, work experience, certifications, salary, and/or the like. In at least one embodiment, the system includes a reactive matching module that performs the steps involved in this comparison. The reactive matching module may be implemented, for example, as software running on processor 104 of device 101, client device 108, and/or server 110.

Figure 7B:
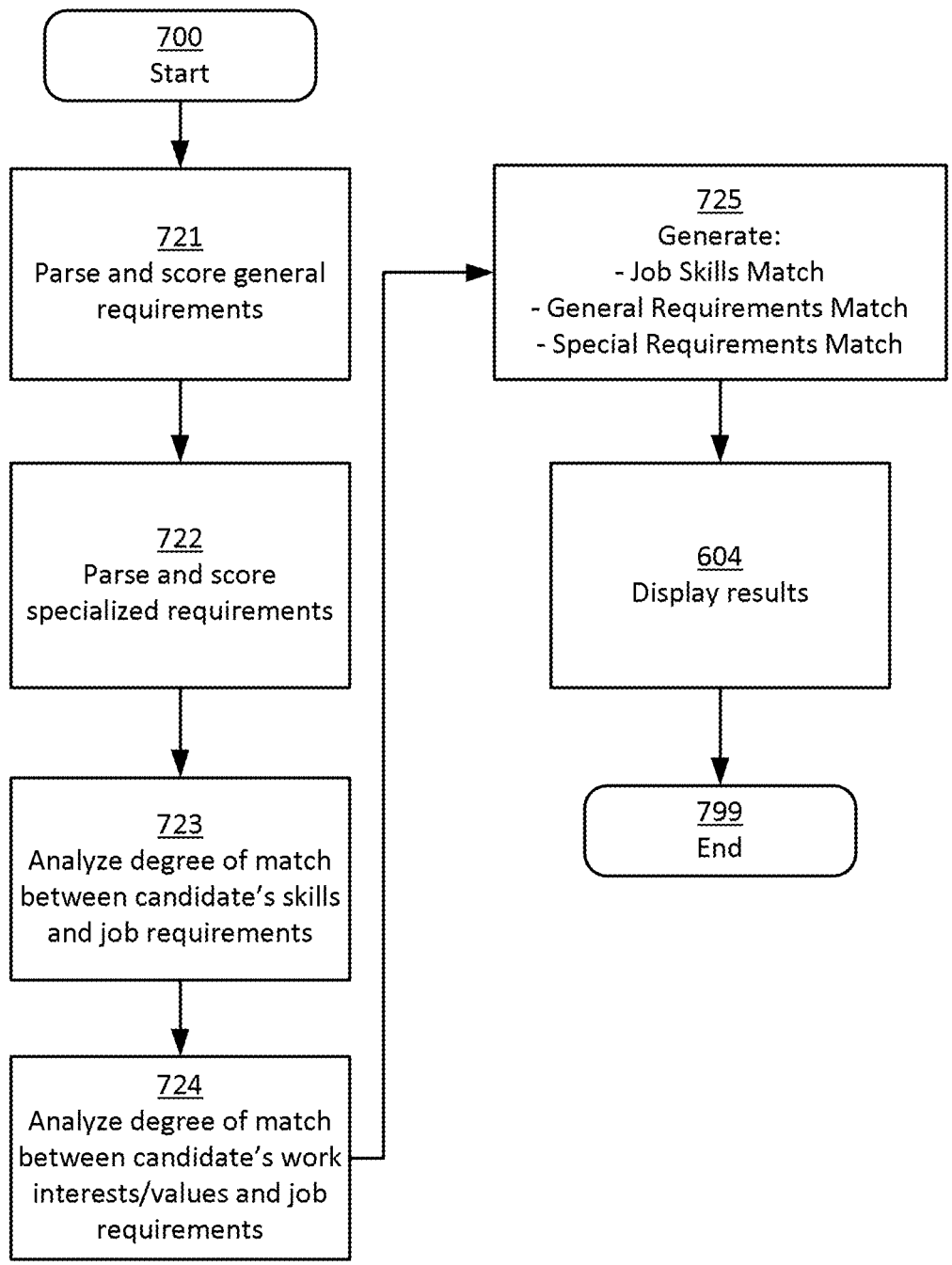
FIG. 7B is a flow diagram depicting method steps for comparing how well a candidate matches a job's requirements, according to one embodiment.

Referring now to FIG. 7B, there is shown a flow diagram depicting a method for performing such comparison.

First, the system parses and scores 721 a set of general requirements relating to a candidate and a job posting. These can include, for example:
The candidate's desired occupation and the occupation the employer is looking for in their job posting.
The candidate's highest education level and the employer's education requirement for the job.
The candidate's work experience and the experience required for the job.
The proximity of candidate's residence to the job worksite.
The candidate's desired salary and the salary the employer is willing to pay for the position.

In at least one embodiment, parsing and scoring step 721 includes performing an algorithm that examines the level and proximity of match for each element, and weighs the value of each item. The algorithm examines the candidate's home location, desired occupation, maximum education level, and work experience, and compares this information with the job's worksite location, occupation requirements, required education level, and required work experience. Each element is given a score that depending on how close the match is. For example, for a registered nurse position, a candidate who has experience as a licensed practical nurse will receive a score that is higher than a candidate who has been a home health aide. However, the system will score the candidate lower on this element than a candidate who has experience as a registered nurse. The system also factors into the scoring the amount of experience the individual has as a nurse.

The system then parses and scores 722 a set of specialized requirements relating to a candidate and a job posting. These can include, for example:
The shifts that the candidate is willing to work and the shift of the job.

Whether the job requires a driver's license and whether the candidate has a valid driver's license.

Whether the job requires driver's license endorsements and any endorsements or limitations the candidate has on his or her driver's license.

Whether the job has age restrictions and the candidate's age.

Whether the job has a specific security clearance level and the candidate's security clearance level.

Whether the job requires language skills and the language proficiency of the candidate.

Whether the job requires typing skills and the typing speed of the candidate.

In at least one embodiment, parsing and scoring step 722 includes performing an algorithm that examines detailed information about the candidate and determines if he or she meets requirements that are very specific to the job. These requirements are often mandatory, such as a minimum age prerequisite.

Next, the system analyzes 723 the degree to which the candidate's skills and characteristics match a job's requirements. In at least one embodiment, step 723 takes into account the candidate's soft skills as well as his or her technical skills, such as his or her experience with specific tools and technologies. In at least one embodiment, step 723 include analyzing the following elements:

The candidate's job skills and the job skill requirements of the job.

The candidate's personal skills and the personal skills normally required for the job.

The candidate's workplace skills and the workplace requirements of the job.

The tools and technology required in the job and the candidate's experience with the required tools.

In at least one embodiment, analysis step 723 includes performing an algorithm that examines the skills that the employer is looking for and assesses how many of these skills the candidate possesses.

Next, the system analyzes 724 the degree to which the candidate's work interests and work values match the typical requirements of the kind of employer's job in question. In at least one embodiment, step 724 include analyzing the following elements:

The candidate's work interests and the work interests normally associated with the job.

The candidate's work values and the work values normally associated with the job.

In at least one embodiment, analysis step 724 includes performing an algorithm that examines the work interests and work values typically associated with candidates in the job in question, and how well the candidate matches these interests and values.

In at least one embodiment, based on the results of steps 721 to 724, the system generates 725 three summary scores, as follows:

Job Skills Match (expressed, for example, as a percentage);

General Requirements Match (expressed, for example, as a percentage);

Special Requirements Match (expressed, for example, as a "Yes", "No" or "N/A"). If any special requirement is not met then a "No" is displayed. All Special Requirements must be met for a "Yes" to be displayed. If there are no Special Requirements a "N/A" is displayed.

Figure 3:
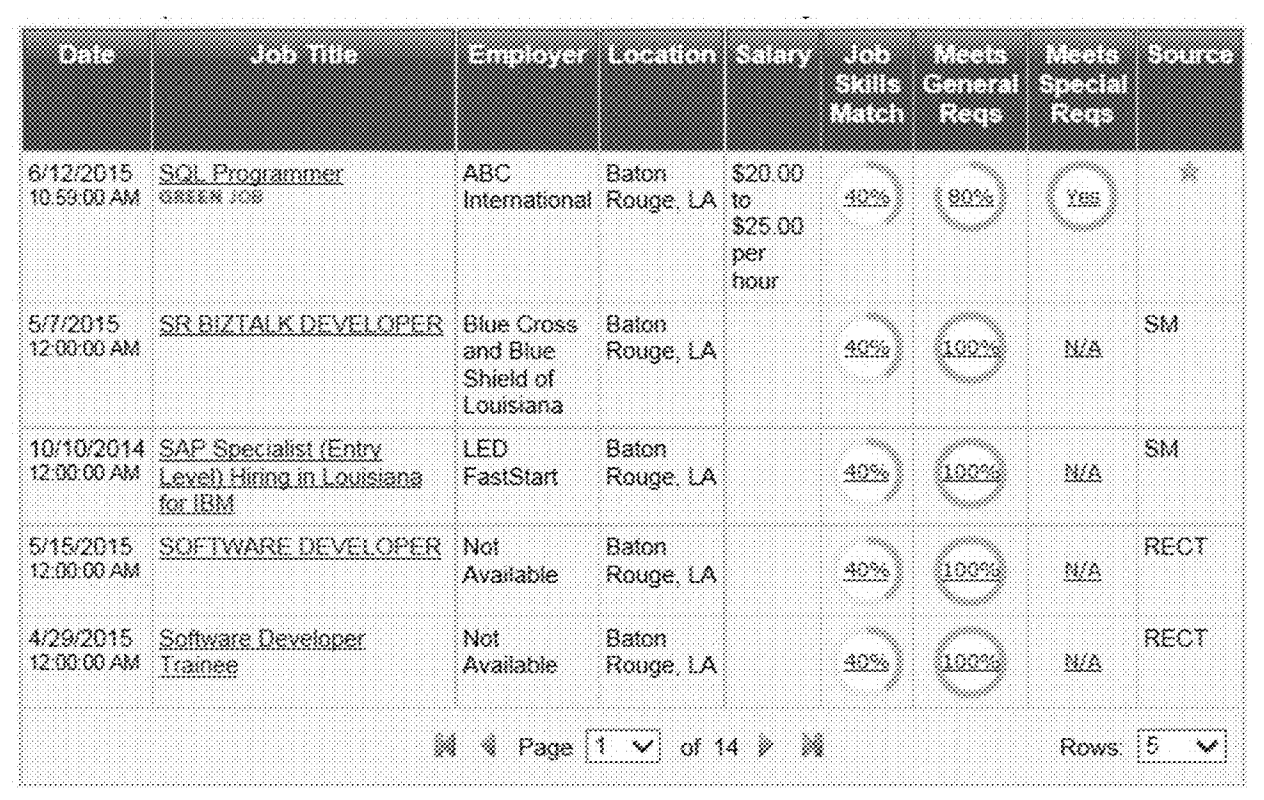

The results are then displayed 604. Referring now to FIG. 3, there is shown a screen shot 300 depicting an example of a displayed list 301 of matching jobs 302, according to one embodiment. Column 303 displays job titles. Column 304 displays employers. Column 305 displays locations of jobs. Column 306 displays salary.

Column 307 displays a graphical depiction of the Job Skills Match, which may be shown as a percentage of a circle. Column 308 displays a graphical depiction of the General Requirements Match. In at least one embodiment, Job Skills Match and General Requirements Match are graphically displayed as an arc forming a part of a circle; the degree to which the circle is complete reflects the value of the Match, expressed as a percentage.

Column 309 displays a graphical depiction of a Special Requirements match. In at least one embodiment, this may be displayed as a circle containing either "Yes", "No" or "N/A". Column 310 displays the source of the record.

The Job Skills Match, General Requirements Match, and Special Requirements Match provide employers with an accurate assessment of how well a candidate meets their exact requirements. The employer can rank and filter candidates based on the total score or on individual components of the score.

The same three scores provide candidates with an accurate assessment of how well they meet the requirements of specific jobs. Candidates can rank and filter jobs based on the total match score or on individual components of the score. Additional details concerning such ranking and filtering are provided below.

In at least one embodiment, the system can be configured to automatically notify an employer of a potential match when a new candidate enters the system, either directly or via the résumé aggregation process.

In at least one embodiment, each score can further be broken down into its components. Referring now to FIG. 4, there is shown an example of a display 400 of detailed information concerning a General Requirements Match score, according to one embodiment. In this example, the components of the General Requirements Match are displayed as quadrants of circle 401. The closer the match, the more quadrants of circle 401 are filled in. A graphical display such as circle 401 can be shown to depict the level of match for Occupation, Education, Work Experience and/or Salary. Also shown is the overall General Requirements Match score, shown as a portion of a circle as in FIG. 3.

Referring now to FIG. 5A, there is shown an example of a display 500 of detailed information concerning a Specialized Requirements Match score, a according to one embodiment. In this example, the individual components of the Specialized Requirements match are shown as circles 501 containing the word "Yes" or "No". In this example, the components are Shift, Minimum Age, Driver's License Required, Driver's License Endorsements, Typing Speed, Security Clearance, and Language and Proficiency. A circle 501 can be shown for each, if specified. Also shown is the overall Specialized Requirements Match Score 502, shown as the word "Yes" or "No" in a circle as in FIG. 3.

Figure 5B:
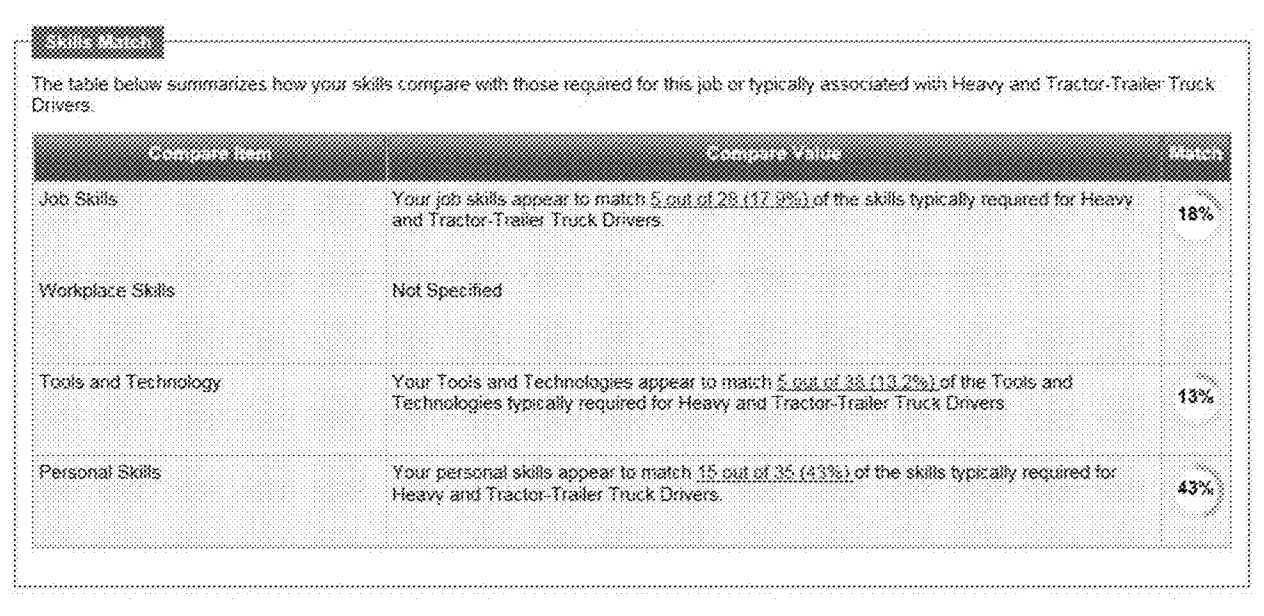

Referring now to FIG. 5B, there is shown an example of a display 510 of detailed information concerning a Skills Match score, a according to one embodiment. In this example, the four individual components of the Skills Match are shown as a percentage of a circle 511. Here, these are Job Skills, Workplace Skills, Tools and Technology and Personal Skills.

Figure 5C:
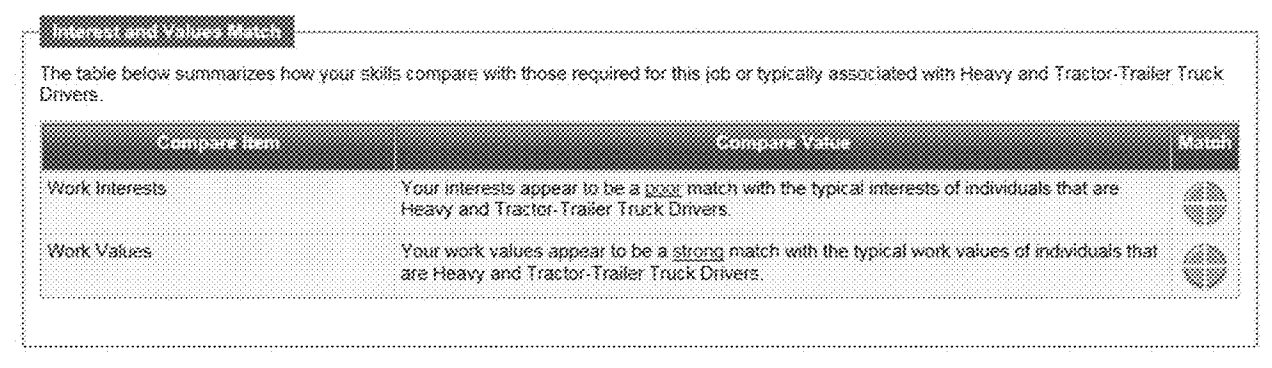

Referring now to FIG. 5C, there is shown an example of a display 520 of detailed information concerning an Interest and Values Match score, according to one embodiment. In this example, the components of each of the Interest and Work Values Match are displayed as quadrants of circle 521. The closer the match, the more quadrants of circle 521 are filled in.

Figure 8:
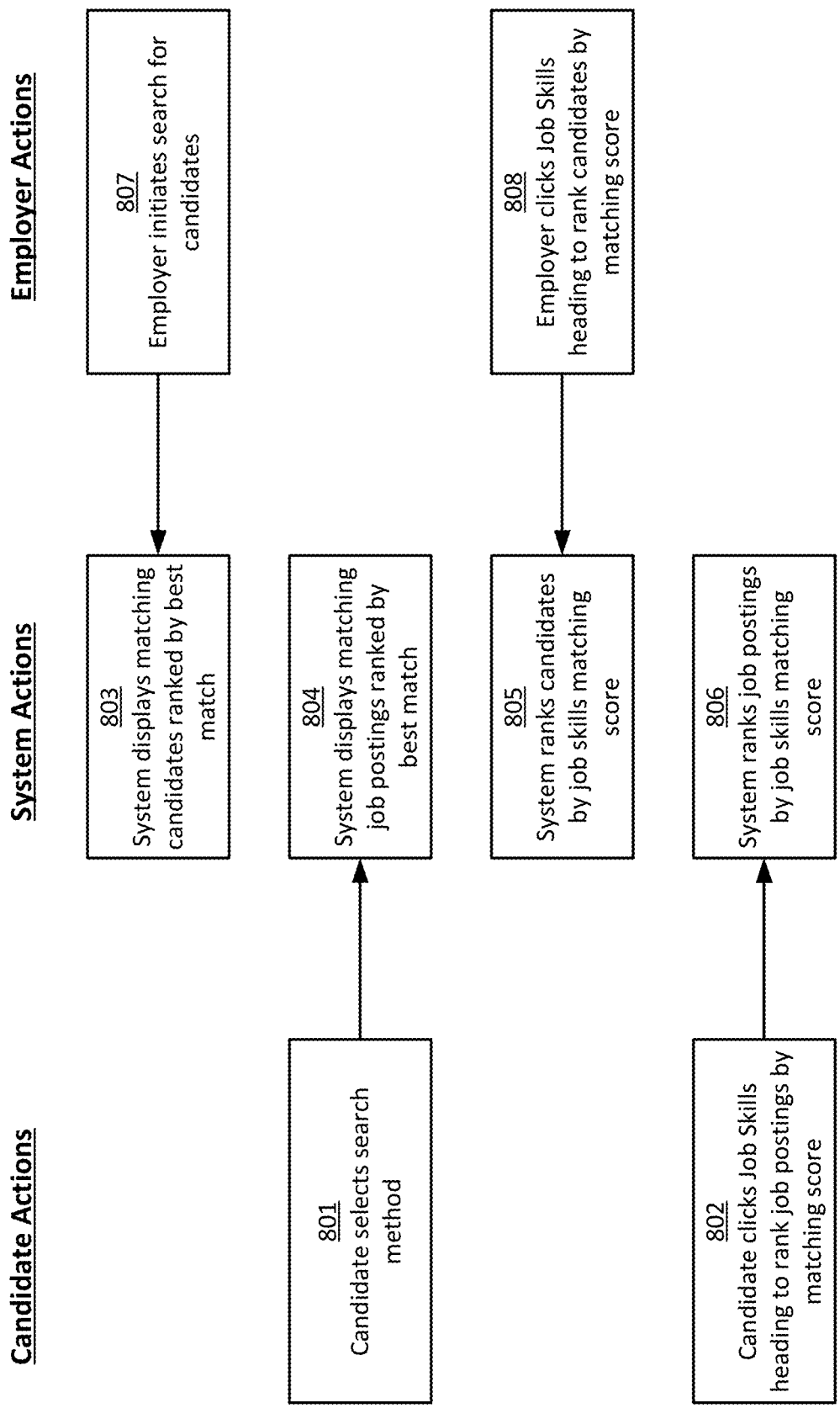
FIGS. 8 and 9 are flow diagrams depicting method steps for ranking and matching candidates against job postings, according to one embodiment.
Figure 9:
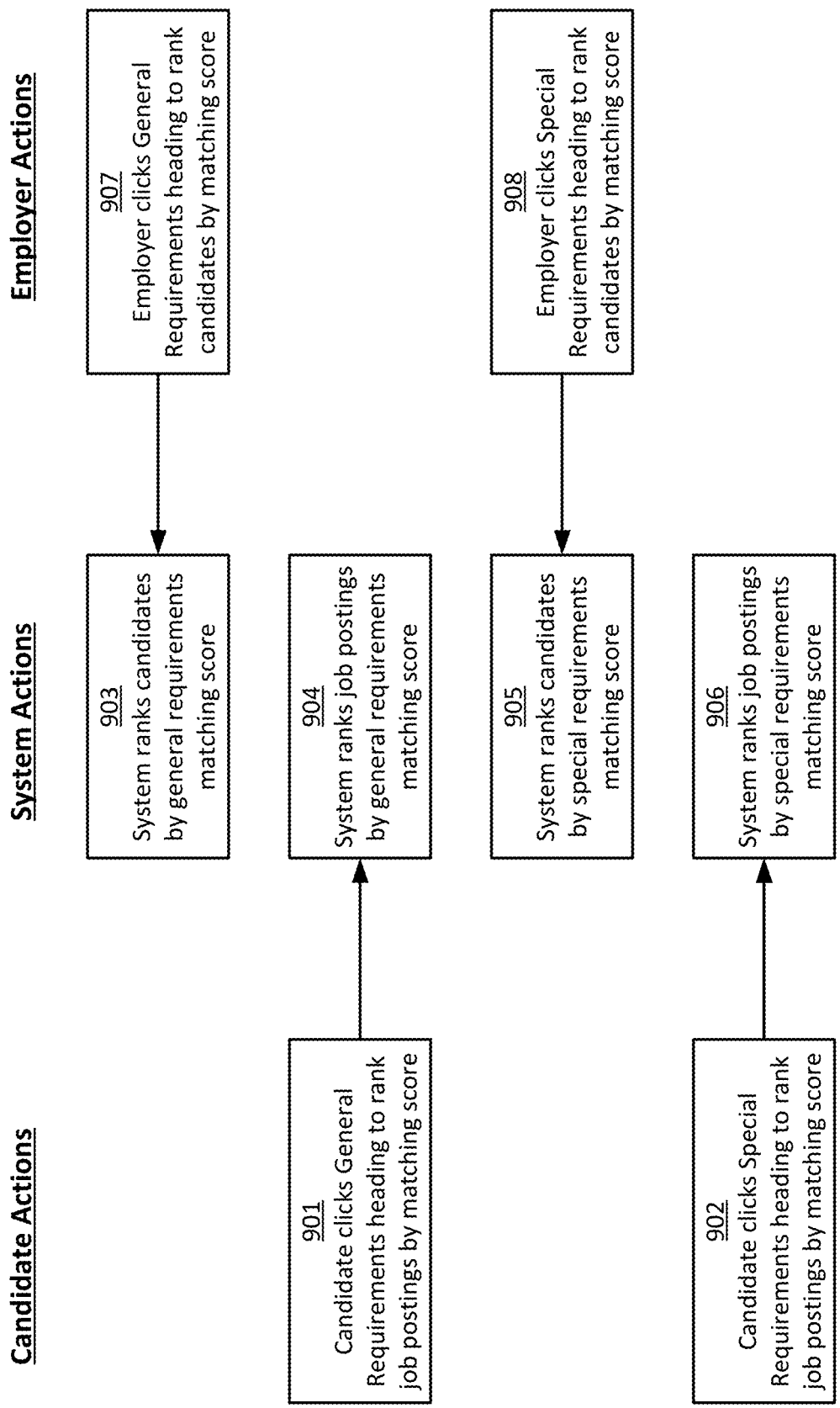

Referring now to FIGS. 8 and 9, there are shown flow diagrams depicting method steps for ranking and matching candidates against job postings, according to one embodiment. The left side of these Figures depicts actions (steps) generally performed by the candidate; the middle depicts actions generally performed by the system; and the right side depicts actions generally performed by the employer.

In at least one embodiment, the candidate selects 801 from a variety of search methods to view job listings. In response, the system uses the reactive talent matching (RTM) techniques described herein to display 804 matching job postings, ranked by the best match based on the selected search method.

In at least one embodiment, a candidate can click 802 on a Job Skills heading to rank job postings by matching score. In response, the system uses RTM to rank 806 job postings by the Job Skills matching score.

In at least one embodiment, an employer can use the system to initiate 807 a search for candidates. In response, the system uses RTM to display 803 matching candidates ranked by the best match based on the selected search method.

In at least one embodiment, an employer can click on a Job Skills heading to rank candidates by matching score. In response, the system uses RTM to rank 805 candidates by the Job Skills matching score.

In at least one embodiment, a candidate can click 901 on a General Requirements heading to rank job postings by matching score. In response, the system uses RTM to rank 904 job postings by General Requirements matching score.

In at least one embodiment, a candidate can click 902 on a Special Requirements heading to rank job postings by matching score. In response, the system uses RTM to rank 906 job postings by the Special Requirements matching score.

In at least one embodiment, an employer can click 907 on a General Requirements heading to rank candidates by matching score. In response, the system uses RTM to rank 903 candidates by the General Requirements matching score.

In at least one embodiment, an employer can click 908 on a Special Requirements heading to rank candidates by matching score. In response, the system uses RTM to rank 905 candidates by the Special Requirements matching score.

Figure 10:
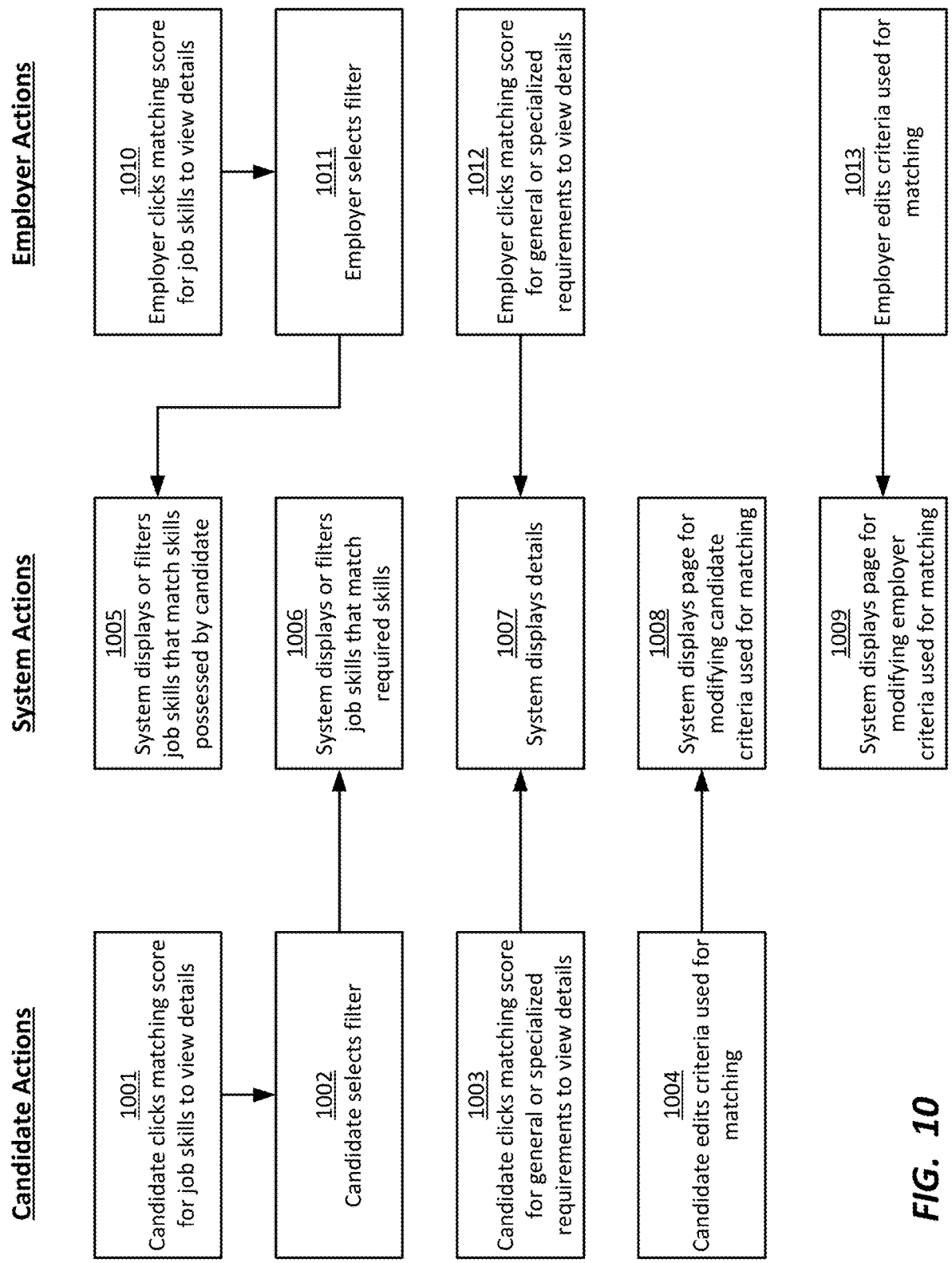
FIG. 10 is a flow diagram depicting method steps for filtering results, displaying details, and editing criteria, according to one embodiment.

Referring now to FIG. 10, there is shown a flow diagram depicting method steps for filtering results, displaying details, and editing criteria, according to one embodiment. The left side of the Figure depicts actions (steps) generally performed by the candidate; the middle depicts actions generally performed by the system; and the right side depicts actions generally performed by the employer.

In at least one embodiment, a candidate can click 1001 a matching score link for Job Skills to view details. Optionally, the candidate can select 1002 a filter, for example to display only the jobs skills they have or do not have. In response, the system uses RTM to display or filter 1006 Job Skills that match the required skills.

In at least one embodiment, a candidate can click 1003 a matching score link for General or Specialized Requirements. In response, the system uses RTM to display 1007 details of all categories, including a set of panels. Each panel lists the comparison item and shows a value for the candidate and for the job value. Each panel can also include links for updating values.

In at least one embodiment, a candidate can edit 1004 job posting criteria used for matching. In response to such a request, the system displays 1008 a page for modifying candidate criteria used for matching.

In at least one embodiment, an employer can click 1010 a matching score link for Job Skills to view details. Optionally, the employer can select 1011 a filter, for example to display only the jobs skills the candidate has or does not have. In response, the system uses RTM to display or filter 1005 Job Skills that match skills possessed by the candidate.

In at least one embodiment, an employer can click 1012 a matching score link for General or Specialized Requirements. In response, the system uses RTM to display 1007 details of all categories, including a set of panels. Each panel lists the comparison item and shows a value for the candidate and for the job value. Each panel can also include links for updating values.

In at least one embodiment, an employer can edit 1013 job posting criteria used for matching. In response to such a request, the system displays 1009 a page for modifying job posting criteria used for matching.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for matching candidates against online job postings, comprising:
   a) at a processor, automatically extracting information describing a plurality of candidates;
   b) at the processor, automatically extracting job posting information from a plurality of disparate external online sources having a plurality of job postings in different formats, the job posting information comprising:
      a set of general requirements, each representing a general characteristic that is required of a candidate to be considered for the job posting; and
      a set of specialized requirements, each representing a more specialized characteristic that is required of a candidate to be considered for the job posting;
   c) at the processor, automatically aggregating the extracted job posting information, including both the general requirements and the specialized requirements, to place the job posting information in a consistent format;
   d) storing the aggregated information at an electronic storage device;
   e) receiving a request;
   f) responsive to the request, at the processor, comparing at least a subset of the candidates against the general requirements and specialized requirements of at least a subset of the job postings, to determine suitability of candidates for the job postings; and
   g) at an output device, generating output to display results of the comparing step;
   wherein comparing the at least a subset of the candidates against the general requirements and specialized requirements of at least a subset of the job postings comprises performing a reactive pattern matching process comprising the substeps of, for each candidate:

f.1) determining whether the candidate matches the general requirements of at least one job posting; and f.2) subsequent to substep f.1), responsive to a determination that the candidate matches the general requirements of at least one job posting, determining whether the candidate matches the specialized requirements of the at least one job posting.

2. The computer-implemented method of claim 1, wherein:

steps a), b), c), and f) are performed by a processor operating at a server communicatively coupled to a plurality of client machines;

step d) is performed at a storage device communicatively coupled to the server; and step e) comprises receiving a request transmitted from one of the client machines to the server.

3. The computer-implemented method of claim 2, wherein:

step g) comprises transmitting a signal to the client machine that transmitted the request, the signal comprising a representation of the results for display on the client machine.

4. The computer-implemented method of claim 1, wherein performing the reactive pattern matching process comprises performing at least one selected from the group consisting of:

determining a degree to which characteristics of at least one candidate match the general requirements and specialized requirements of at least one job posting;

ranking a plurality of candidates according to a degree to which each candidate matches the general requirements and specialized requirements of at least one job posting; and ranking a plurality of job postings according to a degree to which a candidate matches the general requirements and specialized requirements of each job posting.

5. The computer-implemented method of claim 1, wherein automatically extracting information describing a plurality of candidates comprises automatically extracting information from electronically submitted resumes.

6. The computer-implemented method of claim 1, wherein automatically extracting information describing a plurality of candidates comprises automatically extracting information describing at least one selected from the group consisting of:

candidate qualifications; and a description of the types of jobs a candidate is seeking.

7. The computer-implemented method of claim 1, wherein performing the reactive pattern matching process comprises performing weighted analysis of a plurality of factors describing the candidates and the job postings.

8. The computer-implemented method of claim 1, wherein the generated output comprises at least one selected from the group consisting of:

for at least one candidate, at least one selected from the group consisting of:

a list of jobs;

an indicator of a general requirements match for each job in the list of jobs;

an indicator of a special requirement match for each job in the list of jobs; and for at least one job, at least one selected from the group consisting of:

a list of candidates;

an indicator of a general requirements match for each candidate in the list of candidates; and an indicator of a special requirement match for each candidate in the list of candidates.

9. The computer-implemented method of claim 1, wherein the generated output comprises, for each of at least one candidate, a list of a plurality of job postings for the candidate, including a graphical indication of a degree of match between the candidate and each of the listed job postings.

10. The computer-implemented method of claim 9, wherein:

steps a), b), c), and f) are performed by a processor operating at a server communicatively coupled to a plurality of client machines;

step d) is performed at a storage device communicatively coupled to the server; and step e) comprises receiving a request transmitted from one of the client machines to the server.

11. The computer-implemented method of claim 10, wherein:

step g) comprises transmitting a signal to the client machine that transmitted the request, the signal comprising a representation of the results for display on the client machine.

12. The computer-implemented method of claim 9, wherein performing the reactive pattern matching process comprises performing at least one selected from the group consisting of:

determining a degree to which characteristics of at least one candidate match the requirements of at least one job posting;

ranking a plurality of candidates according to a degree to which each candidate matches the requirements of at least one job posting; and ranking a plurality of job postings according to a degree to which a candidate matches the requirements of each job posting.

13. The computer-implemented method of claim 9, wherein automatically extracting information describing a plurality of candidates comprises automatically extracting information from electronically submitted resumes.

14. The computer-implemented method of claim 9, wherein automatically extracting information describing a plurality of candidates comprises automatically extracting information describing at least one selected from the group consisting of:

candidate qualifications; and a description of the types of jobs a candidate is seeking.

15. The computer-implemented method of claim 9, wherein performing the reactive pattern matching process comprises performing weighted analysis of a plurality of factors describing the candidates and the job postings.

16. The computer-implemented method of claim 9, wherein the generated output comprises at least one selected from the group consisting of:

for at least one candidate, at least one selected from the group consisting of:

a list of jobs;

a graphical indicator of a degree of match between the candidate and at least one general requirement of each job in the list of jobs;

a graphical indicator of a degree of match between the candidate and at least one special requirement of each job in the list of jobs; and for at least one job, at least one selected from the group consisting of:
  a list of candidates;
  a graphical indicator of a degree of match between at least one general requirement of the job and each candidate in the list of candidates; and
  a graphical indicator of a degree of match between at least one special requirement of the job and each candidate in the list of candidates.

17. The computer-implemented method of claim 9, wherein the graphical indication of a degree of match between the candidate and each of the listed job postings comprises an arc forming a part of a circle, wherein the degree to which the arc completes the circle reflects the degree of the match.

18. The computer-implemented method of claim 1, wherein:
  the set of general requirements comprises at least one selected from the group consisting of:
    a location of a job site;
    an education requirement;
    a work experience requirement; and
    an expected salary; and
  the set of specialized requirements comprises at least one selected from the group consisting of:
    a work shift;
    a driver's license requirement;
    a driver's license endorsement requirement;
    at least one age restriction;
    at least one security clearance level requirement;
    at least one language skill requirement; and
    at least one typing skill requirement.

19. A non-transitory computer-readable medium for matching candidates against job postings, comprising instructions stored thereon, that when executed by a processor, perform the steps of:
  a) automatically extracting information describing a plurality of candidates;
  b) automatically extracting job posting information from a plurality of disparate external online sources having a plurality of job postings in different formats, the job posting information comprising:
    a set of general requirements, each representing a general characteristic that is required of a candidate to be considered for the job posting; and
    a set of specialized requirements, each representing a more specialized characteristic that is required of a candidate to be considered for the job posting;
  c) automatically aggregating the extracted job posting information, including both the general requirements and the specialized requirements, to place the job posting information in a consistent format;
  d) causing an electronic storage device to store the aggregated information;
  e) receiving a request;
  f) responsive to the request, comparing at least a subset of the candidates against the general requirements and specialized requirements of at least a subset of the job postings, to determine suitability of candidates for the job postings; and
  g) causing an output device to display results of the comparing step;
  wherein comparing the at least a subset of the candidates against the general requirements and specialized requirements of at least a subset of the job postings comprises performing a reactive pattern matching process comprising the substeps of, for each candidate:
    f.1) determining whether the candidate matches the general requirements of at least one job posting; and
    f.2) subsequent to substep f.1), responsive to a determination that the candidate matches the general requirements of at least one job posting, determining whether the candidate matches the specialized requirements of the at least one job posting.

20. The non-transitory computer-readable medium of claim 19, wherein performing the reactive pattern matching process comprises performing at least one selected from the group consisting of:
  determining a degree to which characteristics of at least one candidate match requirements of at least one job posting;
  ranking a plurality of candidates according to a degree to which each candidate matches requirements of at least one job posting; and
  ranking a plurality of job postings according to a degree to which a candidate matches requirements of each job posting.

21. The non-transitory computer-readable medium of claim 19, wherein automatically extracting information describing a plurality of candidates comprises automatically extracting information from electronically submitted resumes.

22. The non-transitory computer-readable medium of claim 19, wherein automatically extracting information describing a plurality of candidates comprises automatically extracting information describing at least one selected from the group consisting of:
  candidate qualifications; and
  a description of the types of jobs a candidate is seeking.

23. The non-transitory computer-readable medium of claim 19, wherein performing the reactive pattern matching process comprises performing weighted analysis of a plurality of factors describing the candidates and the job postings.

24. The non-transitory computer-readable medium of claim 19, wherein the generated output comprises at least one selected from the group consisting of:
  for at least one candidate, at least one selected from the group consisting of:
    a list of jobs;
    an indicator of a general requirements match for each job in the list of jobs;
    an indicator of a special requirement match for each job in the list of jobs; and
  for at least one job, at least one selected from the group consisting of:
    a list of candidates;
    an indicator of a general requirements match for each candidate in the list of candidates; and
    an indicator of a special requirement match for each candidate in the list of candidates.

25. The non-transitory computer-readable medium of claim 19, wherein causing the output device to display results of the comparing step comprises causing the output device to display, for each of at least one candidate, a list of a plurality of job postings for the candidate, including a graphical indication of a degree of match between the candidate and each of the listed job postings.

26. The non-transitory computer-readable medium of claim 25, wherein performing the reactive pattern matching process comprises performing at least one selected from the group consisting of:

determining a degree to which characteristics of at least one candidate match requirements for at least one job posting;
ranking a plurality of candidates according to a degree to which each candidate matches requirements for at least one job posting; and
ranking a plurality of job postings according to a degree to which a candidate matches requirements for each job posting.

27. The non-transitory computer-readable medium of claim 25, wherein automatically extracting information describing a plurality of candidates comprises automatically extracting information from electronically submitted resumes.

28. The non-transitory computer-readable medium of claim 25, wherein automatically extracting information describing a plurality of candidates comprises automatically extracting information describing at least one selected from the group consisting of:
candidate qualifications; and
a description of the types of jobs a candidate is seeking.

29. The non-transitory computer-readable medium of claim 25, wherein performing the reactive pattern matching process comprises performing weighted analysis of a plurality of factors describing the candidates and the job postings.

30. The non-transitory computer-readable medium of claim 25, wherein the generated output comprises at least one selected from the group consisting of:
for at least one candidate, at least one selected from the group consisting of:
a list of jobs;
a graphical indicator of a degree of match between the candidate and at least one general requirement of each job in the list of jobs;
a graphical indicator of a degree of match between the candidate and at least one special requirement of each job in the list of jobs; and
for at least one job, at least one selected from the group consisting of:
a list of candidates;
a graphical indicator of a degree of match between at least one general requirement of the job and each candidate in the list of candidates; and
a graphical indicator of a degree of match between at least one special requirement of the job and each candidate in the list of candidates.

31. The non-transitory computer-readable medium of claim 25, wherein the graphical indication of a degree of match between the candidate and each of the listed job postings comprises an arc forming a part of a circle, wherein the degree to which the arc completes the circle reflects the degree of the match.

32. The non-transitory computer-readable medium of claim 19, wherein:
the set of general requirements comprises at least one selected from the group consisting of:
a location of a job site;
an education requirement;
a work experience requirement; and
an expected salary; and
the set of specialized requirements comprises at least one selected from the group consisting of:
a work shift;
a driver's license requirement;
a driver's license endorsement requirement;
at least one age restriction;
at least one security clearance level requirement;
at least one language skill requirement; and
at least one typing skill requirement.

33. A system for matching candidates against job postings, comprising:
a processor, configured to perform the steps of:
automatically extracting information describing a plurality of candidates;
extracting job posting information from a plurality of disparate external online sources having a plurality of job postings in different formats, the job posting information comprising:
a set of general requirements, each representing a general characteristic that is required of a candidate to be considered for the job posting; and
a set of specialized requirements, each representing a more specialized characteristic that is required of a candidate to be considered for the job posting; and
automatically aggregating the extracted job posting information, including both the general requirements and the specialized requirements, to place the job posting information in a consistent format;
an electronic storage device, communicatively coupled to the processor, configured to store the aggregated information; and
an electronic communications module, communicatively coupled to the processor, configured to receive a request;
wherein the processor is further configured to, responsive to the request, compare at least a subset of the candidates against the general requirements and specialized requirements of at least a subset of the job postings, to determine suitability of candidates for the job postings;
and wherein the system further comprises an output device, communicatively coupled to the processor, configured to generate output to display results of the comparing step;
and wherein comparing the at least a subset of the candidates against the general requirements and specialized requirements of at least a subset of the job postings comprises performing a reactive pattern matching process comprising the substeps of, for each candidate:
f.1) determining whether the candidate matches the general requirements of at least one job posting; and
f.2) subsequent to substep f.1), responsive to a determination that the candidate matches the general requirements of at least one job posting, determining whether the candidate matches the specialized requirements of the at least one job posting.

34. The system of claim 33, wherein performing the reactive pattern matching process comprises performing at least one selected from the group consisting of:
determining a degree to which characteristics of at least one candidate match requirements of at least one job posting;
ranking a plurality of candidates according to a degree to which each candidate matches requirements of at least one job posting; and
ranking a plurality of job postings according to a degree to which a candidate matches requirements of each job posting.

35. The system of claim 33, wherein automatically extracting information describing a plurality of candidates comprises automatically extracting information from electronically submitted resumes.

36. The system of claim 33, wherein automatically extracting information describing a plurality of candidates comprises automatically extracting information describing at least one selected from the group consisting of:
 candidate qualifications; and
 a description of the types of jobs a candidate is seeking.

37. The system of claim 33, wherein automatically extracting information describing a plurality of job postings comprises automatically extracting information describing at least one selected from the group consisting of:
 general requirements for the job; and
 specialized requirements for the job.

38. The system of claim 33, wherein performing the reactive pattern matching process comprises performing weighted analysis of a plurality of factors describing the candidates and the job postings.

39. The system of claim 33, wherein the generated output comprises at least one selected from the group consisting of:
 for at least one candidate, at least one selected from the group consisting of:
  a list of jobs;
  an indicator of a general requirements match for each job in the list of jobs;
  an indicator of a special requirement match for each job in the list of jobs; and
 for at least one job, at least one selected from the group consisting of:
  a list of candidates;
  an indicator of a general requirements match for each candidate in the list of candidates; and
  an indicator of a special requirement match for each candidate in the list of candidates.

40. The system of claim 33, wherein the generated output comprises, for each of at least one candidate, a list of a plurality of job postings for the candidate, including a graphical indication of a degree of match between the candidate and each of the listed job postings.

41. The system of claim 40, wherein performing the reactive pattern matching process comprises performing at least one selected from the group consisting of:
 determining a degree to which characteristics of at least one candidate match requirements for at least one job posting;
 ranking a plurality of candidates according to a degree to which each candidate matches requirements for at least one job posting; and
 ranking a plurality of job postings according to a degree to which a candidate matches requirements for each job posting.

42. The system of claim 40, wherein automatically extracting information describing a plurality of candidates comprises automatically extracting information from electronically submitted resumes.

43. The system of claim 40, wherein automatically extracting information describing a plurality of candidates comprises automatically extracting information describing at least one selected from the group consisting of:
 candidate qualifications; and
 a description of the types of jobs a candidate is seeking.

44. The system of claim 40, wherein automatically extracting information describing a plurality of job postings comprises automatically extracting information describing at least one selected from the group consisting of:
 general requirements for the job; and
 specialized requirements for the job.

45. The system of claim 40, wherein performing the reactive pattern matching process comprises performing weighted analysis of a plurality of factors describing the candidates and the job postings.

46. The system of claim 40, wherein the generated output comprises at least one selected from the group consisting of:
 for at least one candidate, at least one selected from the group consisting of:
  a list of jobs;
  a graphical indicator of a degree of match between the candidate and at least one general requirement of each job in the list of jobs;
  a graphical indicator of a degree of match between the candidate and at least one special requirement of each job in the list of jobs; and
 for at least one job, at least one selected from the group consisting of:
  a list of candidates;
  a graphical indicator of a degree of match between at least one general requirement of the job and each candidate in the list of candidates; and
  a graphical indicator of a degree of match between at least one special requirement of the job and each candidate in the list of candidates.

47. The system of claim 40, wherein the graphical indication of a degree of match between the candidate and each of the listed job postings comprises an arc forming a part of a circle, wherein the degree to which the arc completes the circle reflects the degree of the match.

48. The system of claim 33, wherein:
 the set of general requirements comprises at least one selected from the group consisting of:
  a location of a job site;
  an education requirement;
  a work experience requirement; and
  an expected salary; and
 the set of specialized requirements comprises at least one selected from the group consisting of:
  a work shift;
  a driver's license requirement;
  a driver's license endorsement requirement;
  at least one age restriction;
  at least one security clearance level requirement;
  at least one language skill requirement; and
  at least one typing skill requirement.

49. A computer-implemented method for matching candidates against online job postings, comprising:
 a) at a processor, automatically extracting information describing a plurality of candidates;
 b) at the processor, automatically extracting job posting information from a plurality of disparate external online sources having a plurality of job postings in different formats, the job posting information comprising:
  a set of general requirements, each representing a general characteristic that is required of a candidate to be considered for the job posting; and
  a set of specialized requirements, each representing a more specialized characteristic that is required of a candidate to be considered for the job posting;
 c) at the processor, automatically aggregating the extracted job posting information to place the job posting information in a consistent format;

d) storing the aggregated information at an electronic storage device;
e) receiving a request;
f) responsive to the request, at the processor, comparing at least a subset of the candidates against at least a subset of the job postings, to determine suitability of candidates for the job postings;
g) at an output device, generating output to display results of the comparing step;
h) determining whether at least one newly added candidate has been identified as a potential match for at least one of the job postings; and
i) responsive to at least one newly added candidate being identified as a potential match for at least one of the job postings, automatically transmitting a notification to at least one employer associated with the at least one job posting for which the newly added candidate has been identified as a potential match, the notification identifying the at least one candidate;
wherein comparing the at least a subset of the candidates against the general requirements and specialized requirements of at least a subset of the job postings comprises performing a reactive pattern matching process comprising the substeps of, for each candidate:
f.1) determining whether the candidate matches the general requirements of at least one job posting; and
f.2) subsequent to substep f.1), responsive to a determination that the candidate matches the general requirements of at least one job posting, determining whether the candidate matches the specialized requirements of the at least one job posting.

50. The computer-implemented method of claim 49, wherein:
steps a), b), c), and f) are performed by a processor operating at a server communicatively coupled to a plurality of client machines;
step d) is performed at a storage device communicatively coupled to the server; and
step e) comprises receiving a request transmitted from one of the client machines to the server.

51. The computer-implemented method of claim 50, wherein:
step g) comprises transmitting a signal to the client machine that transmitted the request, the signal comprising a representation of the results for display on the client machine.

52. The computer-implemented method of claim 49, wherein performing the reactive pattern matching process comprises performing at least one selected from the group consisting of:
determining a degree to which characteristics of at least one candidate match the requirements of at least one job posting;
ranking a plurality of candidates according to a degree to which each candidate matches the requirements of at least one job posting; and
ranking a plurality of job postings according to a degree to which a candidate matches the requirements of each job posting.

53. The computer-implemented method of claim 49, wherein automatically extracting information describing a plurality of candidates comprises automatically extracting information from electronically submitted resumes.

54. The computer-implemented method of claim 49, wherein automatically extracting information describing a plurality of candidates comprises automatically extracting information describing at least one selected from the group consisting of:
candidate qualifications; and
a description of the types of jobs a candidate is seeking.

55. The computer-implemented method of claim 49, wherein performing the reactive pattern matching process comprises performing weighted analysis of a plurality of factors describing the candidates and the job postings.

56. The computer-implemented method of claim 49, wherein the generated output comprises at least one selected from the group consisting of:
for at least one candidate, at least one selected from the group consisting of:
a list of jobs;
an indicator of a general requirements match for each job in the list of jobs;
an indicator of a special requirement match for each job in the list of jobs; and
for at least one job, at least one selected from the group consisting of:
a list of candidates;
an indicator of a general requirements match for each candidate in the list of candidates; and
an indicator of a special requirement match for each candidate in the list of candidates.

57. A non-transitory computer-readable medium for matching candidates against job postings, comprising instructions stored thereon, that when executed by a processor, perform the steps of:
a) automatically extracting information describing a plurality of candidates;
b) automatically extracting job posting information from a plurality of disparate external online sources having a plurality of job postings in different formats, the job posting information comprising:
a set of general requirements, each representing a general characteristic that is required of a candidate to be considered for the job posting; and
a set of specialized requirements, each representing a more specialized characteristic that is required of a candidate to be considered for the job posting;
c) automatically aggregating the extracted job posting information to place the job posting information in a consistent format;
d) causing an electronic storage device to store the aggregated information;
e) receiving a request;
f) responsive to the request, comparing at least a subset of the candidates against at least a subset of the job postings, to determine suitability of candidates for the job postings;
g) causing an output device to display results of the comparing step;
h) determining whether at least one newly added candidate has been identified as a potential match for at least one of the job postings; and
i) responsive to at least one newly added candidate being identified as a potential match for at least one of the job postings, automatically causing a notification to be transmitted to at least one employer associated with the at least one job posting for which the newly added candidate has been identified as a potential match, the notification identifying the at least one candidate;

wherein comparing the at least a subset of the candidates against the general requirements and specialized requirements of at least a subset of the job postings comprises performing a reactive pattern matching process comprising the substeps of, for each candidate:

f.1) determining whether the candidate matches the general requirements of at least one job posting; and f.2) subsequent to substep f.1), responsive to a determination that the candidate matches the general requirements of at least one job posting, determining whether the candidate matches the specialized requirements of the at least one job posting.

58. The non-transitory computer-readable medium of claim 57, wherein performing the reactive pattern matching process comprises performing at least one selected from the group consisting of:

determining a degree to which characteristics of at least one candidate match requirements for at least one job posting;

ranking a plurality of candidates according to a degree to which each candidate matches requirements for at least one job posting; and ranking a plurality of job postings according to a degree to which a candidate matches requirements for each job posting.

59. The non-transitory computer-readable medium of claim 57, wherein automatically extracting information describing a plurality of candidates comprises automatically extracting information from electronically submitted resumes.

60. The non-transitory computer-readable medium of claim 57, wherein automatically extracting information describing a plurality of candidates comprises automatically extracting information describing at least one selected from the group consisting of:

candidate qualifications; and a description of the types of jobs a candidate is seeking.

61. The non-transitory computer-readable medium of claim 57, wherein performing the reactive pattern matching process comprises performing weighted analysis of a plurality of factors describing the candidates and the job postings.

62. The non-transitory computer-readable medium of claim 57, wherein the generated output comprises at least one selected from the group consisting of:

for at least one candidate, at least one selected from the group consisting of:
a list of jobs;
an indicator of a general requirements match for each job in the list of jobs;
an indicator of a special requirement match for each job in the list of jobs; and for at least one job, at least one selected from the group consisting of:
a list of candidates;
an indicator of a general requirements match for each candidate in the list of candidates; and
an indicator of a special requirement match for each candidate in the list of candidates.

63. A system for matching candidates against job postings, comprising:

a processor, configured to perform the steps of:
automatically extracting information describing a plurality of candidates;

extracting job posting information from a plurality of disparate external online sources having a plurality of job postings in different formats, the job posting information comprising:
a set of general requirements, each representing a general characteristic that is required of a candidate to be considered for the job posting; and
a set of specialized requirements, each representing a more specialized characteristic that is required of a candidate to be considered for the job posting; and
automatically aggregating the extracted job posting information to place the job posting information in a consistent format;

an electronic storage device, communicatively coupled to the processor, configured to store the aggregated information; and an electronic communications module, communicatively coupled to the processor, configured to receive a request;

wherein the processor is further configured to, responsive to the request, compare at least a subset of the candidates against at least a subset of the job postings, to determine suitability of candidates for the job postings;

and wherein the system further comprises an output device, communicatively coupled to the processor, configured to generate output to display results of the comparing step;

and wherein the processor is further configured to determine whether at least one newly added candidate has been identified as a potential match for at least one of the job postings;

and wherein the electronic communications module is further configured to, responsive to at least one newly added candidate being identified as a potential match for at least one of the job postings, automatically transmit a notification to at least one employer associated with the at least one job posting for which the newly added candidate has been identified as a potential match, the notification identifying the at least one candidate;

and wherein comparing the at least a subset of the candidates against the general requirements and specialized requirements of at least a subset of the job postings comprises performing a reactive pattern matching process comprising the substeps of, for each candidate:

f.1) determining whether the candidate matches the general requirements of at least one job posting; and f.2) subsequent to substep f.1), responsive to a determination that the candidate matches the general requirements of at least one job posting, determining whether the candidate matches the specialized requirements of the at least one job posting.

64. The system of claim 63, wherein performing the reactive pattern matching process comprises performing at least one selected from the group consisting of:

determining a degree to which characteristics of at least one candidate match requirements for at least one job posting;

ranking a plurality of candidates according to a degree to which each candidate matches requirements for at least one job posting; and ranking a plurality of job postings according to a degree to which a candidate matches requirements for each job posting.

65. The system of claim 63, wherein automatically extracting information describing a plurality of candidates comprises automatically extracting information from electronically submitted resumes.

66. The system of claim 63, wherein automatically extracting information describing a plurality of candidates comprises automatically extracting information describing at least one selected from the group consisting of:
- candidate qualifications; and
- a description of the types of jobs a candidate is seeking.

67. The system of claim 63, wherein automatically extracting information describing a plurality of job postings comprises automatically extracting information describing at least one selected from the group consisting of:
- general requirements for the job; and
- specialized requirements for the job.

68. The system of claim 63, wherein performing the reactive pattern matching process comprises performing weighted analysis of a plurality of factors describing the candidates and the job postings.

69. The system of claim 63, wherein the generated output comprises at least one selected from the group consisting of:
- for at least one candidate, at least one selected from the group consisting of:
  - a list of jobs;
  - an indicator of a general requirements match for each job in the list of jobs;
  - an indicator of a special requirement match for each job in the list of jobs; and
- for at least one job, at least one selected from the group consisting of:
  - a list of candidates;
  - an indicator of a general requirements match for each candidate in the list of candidates; and
  - an indicator of a special requirement match for each candidate in the list of candidates.

\* \* \* \* \*